United States Patent [19]
Kennedy

[11] 3,760,681
[45] Sept. 25, 1973

[54] AUDIBLE TIME MEASURING WITH DISCRIMINATING SOUND FOR BEATS WITHIN A GROUP

[75] Inventor: Mervyn R. Kennedy, Sierra Madre, Calif.

[73] Assignee: Relton Corporation, Arcadia, Calif.

[22] Filed: Sept. 10, 1971

[21] Appl. No.: 179,414

[52] U.S. Cl. ............................................. 84/484
[51] Int. Cl. ......................................... G10b 15/00
[58] Field of Search .......................... 84/470, 484; 179/100.1 C, 100.1 R, 100.1 S, 100.2 A

[56] References Cited
UNITED STATES PATENTS

| | | | |
|---|---|---|---|
| 2,142,591 | 1/1939 | Ross | 84/470 X |
| 3,409,743 | 11/1968 | Greefkes | 168/100.1 S X |
| 2,915,121 | 12/1959 | Bloom | 84/484 |
| 3,026,634 | 3/1962 | Irazoqui | 84/470 X |
| 3,406,604 | 10/1968 | Stickley et al. | 84/484 |
| 3,595,122 | 7/1971 | Brediceanu | 84/484 |
| 3,638,952 | 2/1972 | Ban | 274/4 D |

Primary Examiner—Richard B. Wilkinson
Assistant Examiner—John F. Gonzales
Attorney—Hayden A. Carney et al.

[57] ABSTRACT

An instrument produces a selected number of beats per unit time with each beat in a preselected group, which group may represent a measure in music, having a unique sound or recovery to advantageously distinguish the individual beats. The beats may be recorded on a magnetic tape having a plurality of tracks with each track either containing beats at the same frequency as every other track and a different number of beats in a group or beats at a different frequency from every other track with each track having the same number of beats in a group.

19 Claims, 5 Drawing Figures

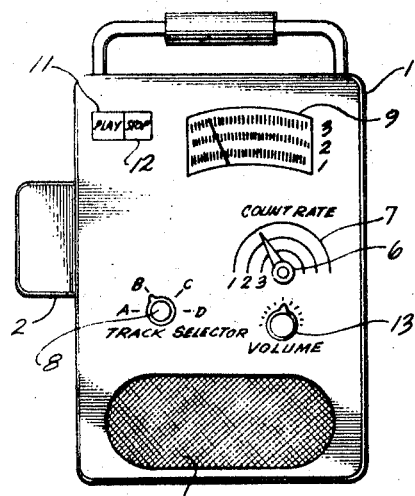
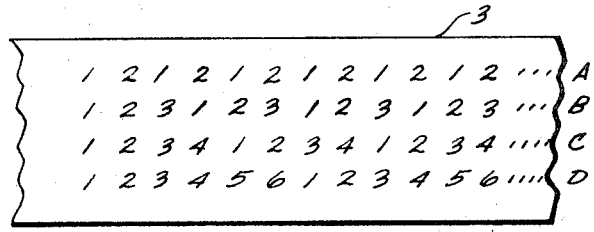
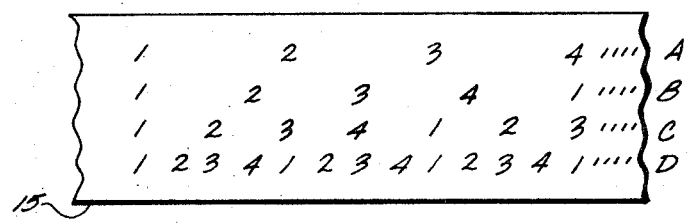
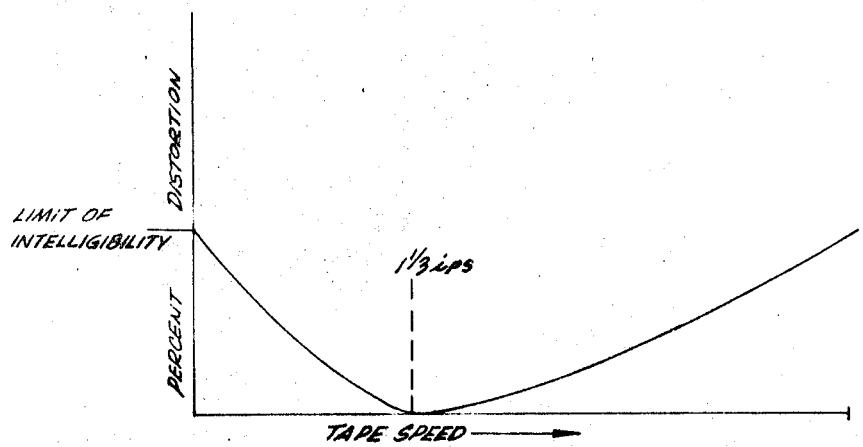

3,760,681

AUDIBLE TIME MEASURING WITH DISCRIMINATING SOUND FOR BEATS WITHIN A GROUP

BACKGROUND OF THE INVENTION

1. Field of the Invention

This invention relates to the method and apparatus for producing a selected number of beats per unit time and more particularly for producing an audible discriminating sound for each beat within a group. The invention is particularly useful in the timing of the playing of music.

2. Description of the Prior Art

A commonly used instrument for measuring time or marking exact time is a metronome. Commercial metronomes generally produce beats at a frequency between 40 and 208 beats per minute. It is important that each musician learn to read music with the proper concern for timing so that he may know when to play. The metronome is generally employed in the effort to give the student the proper timing for the playing of a piece of music.

However, when a student uses a standard metronome, which provides timing merely by a series of ticks, he is required to interpret a tick or a group of ticks as marking off a measure of music. Music is commonly played in a wide variety of beats per measure with the most common being two, three, four, and six beats per measure. A beginning student experiences considerable difficulty in keeping track of where he is within a measure as well as when to begin a measure when learning to play music with the aid of a standard metronome because a metronome does not identify for the student a particular tick in relation to the other ticks.

SUMMARY OF THE INVENTION

The shortcomings of a standard metronome when used as a timing device are overcome by the present invention. The invention broadly involves the providing of an audible discriminating sound for each beat within a group of beats, which group may advantageously represent a measure of music having a predetermined number of beats. For practicing the invention an apparatus for producing a selected number of beats per unit time in accordance with the invention comprises means for storing the beats, with each beat within a preselected group of beats having a unique sound on recovery, and means for recovering and audibilizing each beat. Advantageously the unique identifying sound may be a spoken number, with the beats in each measure being counted. Magnetic tapes may be advantageously used for storing the beats where the tapes may have a plurality of tracks with the beats recorded on each track at the same frequency or at a different frequency. When the beats are recorded at the same frequency, each track has a different number of beats to form a group of beats which may correspond to a measure of music. When the beats are recorded at a different frequency each track may advantageously include the same number of beats in a group. The magnetic tapes are designed to operate over a predetermined range of tape speed and the beats are recorded on the tape at a selected speed and at a selected frequency to permit the entire range of beat frequencies to be intelligible on recovery over the entire range of tape speeds.

BRIEF DESCRIPTION OF THE DRAWINGS

The above and other features and advantages of the present invention may be understood more fully and clearly upon consideration of the following specification and drawing in which:

FIG. 1 is an illustration of a playback unit having controls for an apparatus for producing a selected number of beats per unit time in accordance with the present invention;

FIG. 2 is a face view of a portion of magnetic tape having a plurality of tracks and illustratively showing the recording of beats on the tracks in accordance with the present invention with numbers substituted, for clarity of understanding, in place of the sound track records thereof which would not be visible or comprehensible from a true picture of the tape section;

FIG. 3 is a graph useful in understanding the recording of tapes in accordance with the present invention;

FIG. 4 is a face view of a portion of magnetic tape similar to FIG. 2 having beats recorded thereon in a manner alternative to the manner of recording illustrated in FIG. 2;

and FIG. 5 is a chart useful in understanding the recording of tapes in accordance with the present invention.

DESCRIPTION OF THE PREFERRED EMBODIMENT

An instrument for producing a selected number of beats per unit time is illustratively depicted in FIG. 1. As a preferred embodiment the instrument is a tape player 1 and a tape cartridge 2. Beats or time markers are recorded on the tape of the cartridge 2 with each beat within a selected group having a unique characteristic on recording that makes it identifiable on recovery. For example, each beat within a group may on recovery be a number which is audibilized by the tape player 1. Preferably the counting within each group starts with the number one and each group contains as many beats as required. When the instrument is used for the timing of the playing of music the groups will correspond to the measure of the music and will contain the desired number of beats per measure, the most common of which are two, three, four, and six.

A tape useful in the apparatus for producing a selected number of beats per unit time in accordance with the present invention is illustratively shown in FIG. 2. It is assumed for purposes of illustration that the tape has four tracks, A, B, C, and D, on which information may be recorded. The information will be recorded on the magnetic tape in either digital or analog form which will be represented by a particular condition of magnetization within discrete areas of each track of the tape. For purposes of illustration, numbers are inserted in the discrete areas of each track of the tape of FIG. 2 and the recording in each area will produce the numbers on recovery. Each track has beats recorded at the same frequency as the beats on the other tracks and each track contains a different number of beats in a group. For example, track A contains two beats per group while track D contains six beats per group. The tape of FIG. 2 has the most common beats per measure recorded in the individual tracks with tracks B and C respectively having three beats per group and four beats per group. With the most common beats being divisible into the number 12, the tape is required to have a length no greater than that needed to record 12 beats in each track. Consequently, the tape may be a continuous loop of sufficient length to contain 12 beats in each track. Of course, if it is desired to have a continuous loop tape, the length may be increased to contain any multiple of 12 beats and still be a continuous loop. A tape similar to tape 3 of FIG. 2 contained within a cartridge 2 is useful in the tape player 1 of FIG. 1 to provide a selected range of beats per minute and a selected number of beats per measure.

In recording the information on the tape 3 of FIG. 2 where each track has the same beat frequency, the information is recorded at one tape speed. Thereafter the tape may be run at different speeds to give different beat frequencies. Common tape players which are designed to run the tape of a cartridge at 1 ⅞ inches per second may be readily modified to give it the ability of variable speed to vary the speed of the tape of this invention to give the desired beat frequency. For example, the speed of a tape player may be made variable by inserting a rheostat in series with the armature of the drive motor. Thereafter the speed may be varied by varying the resistance in series with the armature. The insertion of a rheostat in series with the armature of the drive motor will permit a decrease in speed from the maximum speed of 1 ⅞ inches so that a tape designed for use with such a tape player will be recorded at a lower tape speed. In accordance with this invention the tape speed at time of recording for a tape that is designed to be played back in a tape player having a maximum speed of 1 ⅞ inches per second will be the speed at which the least distortion will be produced when playing back the tape over the entire range of tape speeds.

In recording the tape the slowest speed needed to produce the desired range of tape speeds to give the desired range of beat frequencies is first determined. Thereafter, as illustratively shown in the graph of FIG. 3, the tape at time of recording is run at the slowest speed plus approximately one-third of the difference in speed between the fastest and slowest speed. Assuming that it is desired to cover the range usually covered by a standard metronome, i.e., 40 to 208 beats per minute, the range is advantageously divided between three tape cartridges with the first cartridge containing the range between 40 and 70 beats per minute, the second cartridge containing the range between 70 and 123 beats per minute, and the third cartridge containing the range between 123 and 208 beats per minute.

As noted above, each beat within a group has a unique characteristic on recording that permits it to have a unique sound upon recovery and audibilization. Advantageously the unique sound is a number so that the count within each group or measure is verbalized. It has been found that this verbalization is extremely helpful to a beginning music student. When the unique sound of each beat is a number, it is necessary that each number be intelligible to the user of the apparatus. Thus to obtain minimum vocal modulation, all counting should be done at a given pitch in very short tones. It has been found that minimal voice pitch modulation is experienced when the range of standard metronomes of 40 to 208 beats per minute is divided among at least three tapes. With the desired frequency range for cartridge 1 being between 40 beats per minute and 70 beats per minute, the tape should be recorded at a speed of approximately 50 beats per minute.

It has been found that while driving the tape at a drive speed of approximately 1 ⅛ inches per second and singing in a clipped way the words or numbers at a pitch of concert A below middle C, the range between 40 and 70 beats per minute as well as the other ranges may be covered without loss of intelligibility. When recording at the speed of 1 ⅛ inches per second at a pitch of concert A below middle C, the recovered words or numbers at the slowest speed of 40 beats per minute has a pitch of approximately F sharp below middle C and the pitch at the highest speed of 70 beats per minute has a pitch of approximately D above middle C.

The curve of FIG. 3 shows that the deterioration of intelligibility is more rapid as the tape speed is decreased from the speed of recording than it is when the tape speed is increased from the speed of recording. Therefore the tape is advantageously recorded at a speed that is approximately the lowest speed plus one-third of the range of tape speed. Advantageously, the tape player on which the tape of the present invention is played includes means for varying the tape speed. As noted above this may be a rheostat in series with the armature of the drive motor. The rheostat may be controlled by a knob 6 on the front of the player 1. Thereafter the count rate, which is determined by the speed of the tape, may be scaled right on the face of the player as illustratively shown by tape speed control knob 6 and its related scale 7 on tape player 1 of FIG. 1. If the tape is recorded at 1 ⅛ inches per second with a beat or count rate of 50 beats per minute, a playback speed of 1 ⅛ inches per second will result in a count or beat rate of 50 beats per minute.

The tape player further advantageously includes a conventional track selector 8 for use with plural track cartridges. The tape player 1 may include a meter 9 for the visual indication of the beat frequency in place of the scale associated with speed control knob 6. The tape player further includes a speaker 10 illustratively shown on the tape player 1 and a play button 11 and stop button 12, also shown on the front panel of tape player 1. The tape player 1 further includes a volume control knob 13 for controlling the volume of the audible unique sounds of the recorded beats on recovery.

As an alternative to recording the beats in each track at the same frequency and recording a different number of beats per group or measure as shown in FIG. 2, the same number of beats per measure may be recorded on a tape with each track having a different beat frequency as shown on the tape 15 of FIG. 4. In this way the entire range between 40 and 208 beats per minute for a particular number of beats per measure, such as four beats per measure, may be covered by a single tape. Additionally, the entire range may be spread over four tracks, when using a four track tape, for increased intelligibility. Moreover, the speed range required for recording and playback may be decreased as compared to that necessary when recording the entire range on only three tracks.

Even better intelligibility is attainable by using the conventional 8 track tapes. A beginning student generally will not be able to play over 125 beats per measure. So as a practical matter the useful range for beginning students is 40 beats per minute to 125 beats per minute which may be easily covered with little distortion on eight tracks. Employing an eight track tape that is normally driven at 3 ¾ inches-per-second the range of 40 beats per minute to 144 beats per minute can be recorded at a speed of 3 ¼ inches-per-second or some other selected speed as shown on the chart of FIG. 5 of the drawing. Thereafter, on recovery the tape speed may be varied to cover the entire range between approximately 36 beats per minute to 158 beats per minute with very little distortion or voice pitch modulation.

When employing the distributions among the eight tracks shown in FIG. 5, two beats per measure or group and four beats per measure or group may be recorded on a continuous loop tape having a length that takes one minute to cover at the speed of recording. Similarly three beats per measure and six beats per measure may be recorded on a continuous loop tape having a length that takes 3 minutes to cover at the speed of recording.

A tape playback device designed for 8 track tapes will of course be used when 8 track tapes are used.

Various changes may be made in the details of construction without departing from the spirit and scope of the invention as defined by the appended claims.

What is claimed is:

1. A method for providing timed, intelligible indicia for use in playing music in time and with the correct timing comprising the steps of:

recording different continuously repetitive sequences of audibly distinguishable sounds in measured time in separately selectable channels on a recording medium, with each sound in each sequence being audibly distinguishable from the immediately preceding sound, selecting the appropriate recording medium and channel thereon corresponding to the desired timing for the music to be played, and playing back the selected sequence whereby the musician can listen to the appropriate timed sequence and receive distinguishable audible cues.

2. The method in accordance with claim 1 comprising the further step of recording a sufficient number of sequences in each channel so that the recording medium is a continuous loop and each channel has a common starting line.

3. The method in accordance with claim 1 comprising the additional step where the number of sounds in each measure is divisible into the number 12 of recording a sufficient number of sequences in each channel so that the recording medium forms a continuous loop having a multiple of 12 beats in each channel.

4. The method in accordance with claim 1 wherein each sequence begins with the audibly stated number one.

5. A method for providing timed, intelligible indicia for use in playing music in time and with the correct timing comprising the steps of:

recording in separately selectable channels of a multichanneled recording medium at a different frequency for each channel the same continuously repetitive sequence of audibly distinguishable sounds in measured time on a first recording medium, with each sound in the sequence being audibly distinguishable from the immediately preceding sound, selecting the appropriate recording medium and channel thereon corresponding to the desired timing for the music to be played, and playing back the selected recording whereby the musician can listen to the appropriate timed sequence and receive distinguishable audible cues.

6. The method in accordance with claim 5 comprising the further step of recording a sufficient number of sequences in each channel so that each channel is a continuous loop and has a common starting line.

7. The method in accordance with claim 5 wherein each sequence begins with the audibily stated number one.

8. The method in accordance with claim 5 comprising the further step of recording in separately selectable channels of additional multi-channeled recording media at a different frequency for each channel a continuously repetitive sequence of audibly distinguishable sounds in measured time with the sequence of sounds being different from the first sequence of sounds.

9. A method for providing timed, intelligible indicia for use in playing music in time and with the correct timing comprising the steps of:

recording at a selected speed within a range of useful playback speeds wherein the indicia remain intelligible different continuously repetitive sequences of audibly distinguishable sounds in measured time in separately selectable channels on a recording medium, with each sound in each sequence being audibly distinguishable from the immediately preceding sound, selecting the appropriate recording medium and channel thereon corresponding to the desired timing for the music to be played, and playing back the selected sequence whereby the musician can listen to the appropriate timed sequence and receive distinguishable audible cues.

10. A method for providing timed, intelligible indicia for use in playing music in time and with the correct timing comprising the steps of:

recording in separately selectable channels of a multi-channeled recording medium at a selected speed within a range of useful playback speeds wherein the indicia remain intelligible and at a different frequency for each channel the same continuously repetitive sequence of audibly distinguishable sounds in measured time on a recording medium, selecting the appropriate recording medium and channel thereon corresponding to the desired timing for the music to be played, and playing back the selected recording whereby the musician can listen to the appropriate timed sequence and receive distinguishable audible cues.

11. A method for producing timed, intelligible indicia for use in playing music in time and with the correct timing comprising the steps of:

recording in each track of an eight-track magnetic tape at a selected recording speed the same sequence of audibly stated numbers in measured time at a selected frequency with the first track being at a first frequency near the low end of the range and track 8 being at a second frequency near the high end of the range and tracks two through seven being at progressively increasing beat frequencies between the first frequency and the second frequency at the recording speed;

selecting the appropriate magnetic tape having thereon the desired timing for the music to be played; and playing back the appropriate track of the selected magnetic tape at the appropriate speed within the range of speeds for the tape whereby a musician can listen to the appropriate timed sequence.

12. The method in accordance with claim 11 wherein the first frequency is 40 beats per minute and the second frequency is 144 beats per minute.

13. A method for providing timed, intelligible indicia over the range of beat frequencies from 40 beats per minute to 208 beats per minute comprising the steps of:
recording in separate closed loop tracks of a first magnetic tape covering the range of beat frequencies between 40 and 70 different continuously repetitive sequences of audibly stated numbers in measured time at a beat frequency of 50 beats per minute at a tape speed that is one-third the difference between the limits of playback speeds for intelligible recovery over the designated range plus the slowest speed in the range;
recording in separate closed loop tracks of a second magnetic tape covering the range of beat frequencies between 70 and 123 different continuously repetitive sequences of audibly stated numbers in measured time at a beat frequency of 88 beats per minute at a tape speed that is one-third the difference between the limits of playback speeds for intelligible recovery over the designated range plus the slowest speed in the range;
recording in separate closed loop tracks of a third magnetic tape covering the range of beat frequencies between 123 and 208 different continuously repetitive sequences of audibly stated numbers in measured time at a beat frequency of 151 beats per minute at a tape speed that is one-third the difference between the limits of playback speeds for intelligible recovery over the designated range plus the slowest speed in the range;
selecting the appropriate magnetic tape and track on the tape having thereon the desired timing for the music to be played; and
playing back the appropriate track at the appropriate speed whereby a musician can listen to the desired timed sequence.

14. A method for providing timed, intelligible indicia for use in playing music in time and with the correct timing comprising the steps of:
moving a recording medium at a speed that is one-third the difference between the highest useful playback speed and the lowest useful playback speed plus the lowest speed for the range of beat frequencies covered by the recording medium,
recording in one channel of the recording medium a continuously repetitive sequence of audibly distinguishable discrete unique sounds in measured time at the speed of the moving medium, and
playing back the recording medium at a selected speed within the range of speeds in which the discrete unique sounds are intelligible and useful.

15. The method in accordance with claim 14 wherein the discrete unique sounds are sequential numbers starting with the number "one" in each measure.

16. An instrument for providing audible timed intelligible indicia for use in playing music in time and with the correct timing comprising:
a storage medium having separately selectable channels with each channel having a different continuously repetitive sequence of audibly distinguishable sounds in measured time recorded therein at a selected frequency and at a selected recording speed,
with each sound being audibly distinguishable from the immediately preceding sound; and
a playback unit for recovering the sounds in each channel at a selected rate,
the playback unit including means for selecting a particular channel of the storage medium, and means for recovering and audibilizing the selected sequence at a selected speed within the range of speeds for intelligible reproduction.

17. The combination in accordance with claim 16 wherein the selected recording speed is approximately one-third of the difference between the highest intelligible playback speed and the lowest intelligible playback speed for the particular storage medium plus the lowest intelligible playback speed.

18. The combination in accordance with claim 16 wherein the sounds in measured time in each channel is divisible into the number 12 and each channel is a continuous loop.

19. An instrument for providing audible timed intelligible indicia for use in playing music in time and with the correct timing comprising:
a storage medium having separately selectable channels with each channel having the same continuously repetitive sequence of audibly distinguishable sounds in measured time recorded therein at a different frequency for each channel and at a selected recording speed,
with each sound being audibly distinguishable from the immediately preceding sound; and
a playback unit for recovering the sounds in each channel at a selected rate,
the playback unit including means for selecting a particular channel of the storage medium, and
means for recovering and audibilizing the selected sequence at a selected speed within the range of speeds for intelligible reproduction.

* * * * *